Patented Aug. 10, 1948

2,446,519

UNITED STATES PATENT OFFICE 2,446,519

PROCESS FOR PREPARING AMINOPHENOLS

Frederic R. Bean, Rochester, N. Y., assignor to Eastman Kodak Company, Rochester, N. Y., a corporation of New Jersey No Drawing. Application July 29, 1944, Serial No. 547,296

16 Claims. (Cl. 260—575)

This invention relates to a process for preparing aminophenols and more particularly to a process for preparing aminophenols from aromatic nitro compounds.

It is well known that nitrobenzene can be reduced to yield aniline by means of reducing agents comprising metals, such as iron, zinc and tin, and aqueous solutions of mineral acids, such as hydrochloric acid and sulfuric acid. It is also known that nitrobenzene can be reduced to yield phenylhydroxylamine by means of reducing agents comprising metals, such as aluminium, lead, zinc, and magnesium, and substantially neutral aqueous solutions of salts, such as ammonium chloride, sodium chloride and calcium chloride. Moreover, the phenylhydroxylamine thus produced can be converted to p-aminophenol by heating with aqueous mineral acids, the latter step involving the well known rearrangement of phenylhydroxylamine to p-aminophenol.

It is also known that nitrobenzene can be reduced to yield phenylhydroxylamine by dissolving nitrobenzene in hot concentrated sulfuric acid and treating the hot solution with zinc dust. On the other hand, as stated above, treatment of nitrobenzene with zinc and an aqueous solution of sulfuric acid produces aniline.

I have now found that treatment of nitrobenzene with aluminium and an aqueous solution of a mineral acid gives principally not aniline nor phenylhydroxylamine but rather p-aminophenol. In other words, aluminium and an aqueous solution of a mineral acid acts quite differently from metals, such as zinc, iron and tin, in conjunction with an aqueous solution of a mineral acid. I have also found that other aromatic nitro compounds can be similarly converted to aminophenolic compounds.

It is, accordingly, an object of my invention to provide a new process for preparing aminophenols. Other objects will become apparent hereinafter.

In accordance with the invention, an aromatic nitro compound is treated with aluminium and an aqueous solution of an acid. The aluminium is advantageously in a divided form, such as flakes or a powder. The aqueous solution of the mineral acid contains not more than 50 per cent by weight of acid and advantageously contains not more than about 15 per cent by weight of the acid. Sulfuric acid is especially advantageously employed. Other mineral acids can be employed, e. g. phosphoric acid. Hydrochloric acid, generally speaking, is less satisfactory. Organic acids, especially those having a dissociation constant in water at 25° C. not smaller than that of oxalic acid (first hydrogen) can also be used. The acid employed should be one which does not react, under the conditions of the process, with any hydroxylamine derivatives, since compounds of this type appear to be formed during the process. For this reason, formic acid should be avoided. The reduction of the aromatic nitro compound with the aluminium and aqueous solution of the mineral acid is advantageously effected at a temperature of from 50° to 100° C., although the temperature is apparently not critical. Especially good results have been obtained at temperatures between about 80° C. and 100° C. In the case of high melting aromatic nitro compounds, a water miscible solvent, such as ethyl alcohol, or a water immiscible solvent, such as a hydrocarbon, may be added to the reaction mixture to promote dispersion in the aqueous acid.

The following examples will serve to illustrate the manner of practicing my invention. These examples are not intended to limit my invention.

*Example 1.—p-Aminophenol*

61.5 g. of nitrobenzene were mixed with 1500 cc. of water to which had been added 150 g. of sulfuric acid (sp. g. 1.84). The resulting mixture was heated to 80° C. to 100° C. and vigorously stirred while 18 to 19 g. of aluminium flakes were slowly added during the course of two hours. No nitrobenzene remained after three to four hours' heating and stirring. The reaction mixture was filtered to remove the small excess of aluminium and the aluminium collected on the filter was washed with a small amount of water. The total value of the filtrate and washings was between 1500 and 2000 cc. The hot filtrate and washing was made alkaline to brilliant yellow with sodium hydroxide or sodium carbonate and a few grams of sodium sulfite, whereupon aluminium hydroxide precipitated. The mixture was heated to boiling and filtered while hot.

The precipitate of aluminium hydroxide was washed with several 100 cc. portions of hot water. The combined filtrate and washing was evaporated to about 800 cc., whereupon a small amount of aniline by-product separated out. The aniline was removed by steam distillation and the remaining solution was cooled to about 20° C., whereupon p-aminophenol separated out as white flakes. These flakes were filtered off, washed with water and dried in the air. The yield was 41 g. (75 per cent), exclusive of what remained in the mother-liquors. The p-aminophenol was found to contain 65.91 per cent of carbon, 6.3 per cent of hydrogen and 12.89 per cent of nitrogen (calculated for carbon 66.0 per cent, for hydrogen 6.4 per cent and for nitrogen 12.8 per cent). The p-aminophenol melted at 184° C. with decomposition.

Instead of adding the aluminium flakes to a mixture of nitrobenzene, water and sulfuric acid, a sulfuric acid solution in water can be added to a hot stirred suspension of aluminium and aqueous sulfuric acid.

*Example 2.—5-Amino-2-hydroxybenzenesulfonic acid*

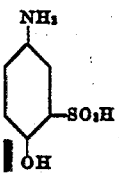

25.5 g. of m-nitrobenzene sulfonic acid were mixed with 500 cc. of water to which 37.5 cc. of concentrated sulfuric acid had been added. The mixture was heated to about 90° C. and 5 g. of aluminium flakes were added slowly with vigorous stirring, holding the temperature at about 90° C. After the addition of the aluminium flakes, the reaction mixture was stirred for an additional hour. The reaction mixture was filtered and the filtrate cooled to 0° C. for several hours, when the 5-amino-2-hydroxybenzene sulfonic acid separated out. This was filtered off and dried. The yield was 15.5 g. When this product was dissolved in aqueous sodium hydroxide in the presence of a small amount of sodium sulfite and reprecipitated by adding hydrochloric acid to the solution, 14 g. of purified produce was obtained. This purified product was found to contain 38.01 per cent by weight of carbon (calculated 38%); 3.86 per cent by weight of nitrogen (calculated 3.7%) and 7.34 per cent by weight of hydrogen (calculated 7.4%). This compound also acted as a photographic developer.

*Example 3.—1,4-Aminonaphthol*

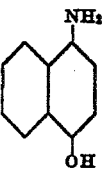

21.5 g. of α-nitronaphthalene were added to 500 cc. of water to which had been added 37.5 cc. of concentrated sulfuric acid. The mixture was heated to 90° C. and 5 g. of aluminium flakes were added gradually with vigorous stirring during a period of 1½ to 2 hours. Following the addition of the aluminium, the mixture was stirred for a further hour at 85° to 90° C. The mixture was filtered hot and the filtrate cooled at 5 to 10° C. for several hours. The product which separated out was washed with water and dried. The yield was 21.8 g. The product was then triturated with two 200 cc. portions of diethyl ether. 17.5 g. of product remained after the ether extraction. Upon evaporating the ether from the ether extract, 3 g. of crystals were obtained. A portion of these crystals were recrystallized from chlorobenzene and melted at 190° to 191° C. These crystals were crystals of 1,4-dihydroxynaphthalene as further shown by analysis: carbon found 74.91 per cent (calculated 75%); hydrogen found 5.09 per cent (calculated 5%). The 17.5 g. of ether-insoluble product was mixed with 100 to 150 cc. of water and 4 to 5 g. of sodium hydroxide and a small amount of sodium hydrosulfite. The alkali-insoluble portion was filtered off and shown to be α-naphthylamine. Yield 4.1 g. To the alkali-soluble portion was added sodium bisulfite and sodium hydrosulfite whereupon a precipitate separated out. This product weighing 13.4 g. was 1,4-aminonaphthol. A portion was converted to the hydrochloride by mixing with concentrated hydrochloric acid. The hydrochloride was found to contain 60.99 per cent of carbon (calculated 61.37%), 6.92 per cent of nitrogen (calculated 7.16%) and 5.69 per cent of hydrogen (calculated 5.75%). The product behaved as a powerful photographic developer.

*Example 4.—4-amino-3-methyl-1-naphthol*

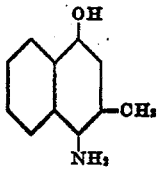

9.3 g. of 2-methyl-1-nitronaphthalene were added to 200 cc. of water to which had been added 15 cc. of concentrated sulfuric acid. The resulting mixture was held at about 90° C. while 2 g. of aluminium flakes were added slowly with vigorous stirring over a period of 1½ to 2 hours. Following the addition of aluminium, the reaction mixture was stirred and heated at 90° C. for 2 to 3 hours. The reaction mixture was then concentrated to a volume of 200 cc. The concentrated mixture was cooled to −5° C. and maintained at this temperature for about 48 hours. The product which precipitated was filtered off and dried. 5.7 g. of product was thus obtained. This product was triturated with several 50 cc. portions of diethyl ether leaving 5.1 g. of ether in the soluble material (amine sulfates). The filtrate from the 5.7 g. of product was extracted with four 100 cc. portions of diethyl ether. Upon evaporating these combined ether extracts to dryness, 1.5 g. of product was obtained. Concentrated hydrochloric acid was added to this product and the mixture was again evaporated to dryness. The resulting residue was triturated with ether leaving 1 g. of an amine hydrochloride. The combined ether extracts from the above two triturations were evaporated to dryness and the residue was dissolved in dilute aqueous sodium hydroxide containing a small amount of sodium sulfite and a small amount of sodium hydrosulfite. The alkaline solution was decolorized with activated charcoal and filtered. To the filtrate was added sodium bisulfite in excess and the product which precipitated was filtered off. This ether-soluble product which weighed 0.5 g. was recrystallized from chlorobenzene. The recrystallized product melted at 174° to 175° C. Upon analysis, the product was found to contain 76.07 per cent by weight of carbon, and 6.03 per cent by weight of hydrogen. This analysis and melting point established that the compound was 1,4-dihydroxy-2-methylnaphthalene (calculated carbon 75.86%, calculated hydrogen 5.79%). Upon oxidation of a small amount of the product in acetic acid with potassium dichromate and sulfuric acid, and pouring the reaction mixture into water, yellow needles separated. These needles melted at 104° C. and were found to contain the carbon and hydrogen required of 2-methyl naphthoquinone (a known anti-hemorrhagic), further establishing the identity of 1,4-dihydroxy-2-methylnaphthalene.

The two ether-insoluble products consisting of 5.1 g. of amine sulfates and 1 g. of amine hydrochlorides were added to a dilute solution of aqueous sodium hydroxide containing a small amount of sodium sulfite and a small amount of sodium hydrosulfite. The undissolved product was filtered off and carefully dried. It weighed 2 g. A portion of the insoluble product was converted to the hydrochloride and upon analysis of the hydrochloride, the following values were found: carbon 67.93 per cent, hydrogen 6.15 per cent and nitrogen 7.39 per cent. This analysis established the product to be 1-amino-2-methylnaphthalene hydrochloride (calculated values: carbon 68.2%, hydrogen 6.25% and nitrogen 7.23%). The sodium hydroxide solution, which was obtained above, was decolorized with activated charcoal and then treated with sodium bisulfite in excess whereupon a precipitate separated out. The precipitate was filtered off and dried. 2 g. of product were thus obtained. The product was converted to the hydrochloride and the hydrochloride was found to contain 62.51 per cent of carbon, 5.64 per cent of hydrogen and 6.48 per cent of nitrogen. This analysis established the product to be 4-amino-3-methyl-1-naphthol hydrochloride (calculated values: carbon 62.99%, hydrogen 5.77% and nitrogen 6.68%). This compound also acted as a photographic developer. This compound can also be oxidized readily to 2-methyl naphthoquinone.

*Example 5.—2-amino-5-hydroxydiphenyl*

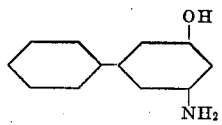

25 g. of o-nitrodiphenyl were added to 500 cc. of water to which had been added 37.5 cc. of concentrated sulfuric acid. The resulting mixture was heated to about 90° C. and held at about this temperature while 5 g. of aluminium were added with vigorous stirring. After all of the aluminium had been added, heating at about 90° C. and stirring were continued for about one hour. Oily by-products separated and these were filtered off. The resulting solution was made alkaline with sodium carbonate and sodium sulfite. The precipitated aluminium hydroxide was then filtered off. Upon cooling, a crystalline product precipitated from the resulting solution. It melted at 115° to 118° C. It was found to contain 77.87 per cent of carbon, 5.77 per cent of hydrogen and 7.53 per cent of nitrogen. This analysis established the product to be 2-amino-5-hydroxydiphenyl (calculated values: carbon 77.8%, hydrogen 5.9% and nitrogen 7.56%). This compound also acted as a photographic developer.

In a similar manner, the following aromatic aminohydroxy compounds have been prepared:

| Starting Materials | Aminohydroxy Compounds |
|---|---|
| m-nitrotoluene | 4-amino-2-methylphenol |
| o-nitrotoluene | 4-amino-3-methylphenol |
| m-nitroanisole | 4-amino-2-methoxyphenol |
| o-nitroanisole | 4-amino-3-methoxyphenol |
| m-chloronitrobenzene | 4-amino-2-chlorophenol |
| o-chloronitrobenzene | 4-amino-3-chlorophenol |
| o-nitroacetophenone | 4-amino-3-acetylphenol |
| m-nitroaniline | 2,4-diaminophenol |
| m-nitrophenol | 4-amino-2-hydroxyphenol |
| o-nitrodiphenylether | 4-amino-3-phenoxyphenol |
| o-nitroethylbenzene | 4-amino-3-ethylphenol |

What I claim as my invention and desire to be secured by Letters Patent of the United States is:

1. A process for preparing an aminophenol comprising reducing a nitroaromatic compound containing no substituent in the para position to the nitro group by reacting the nitroaromatic compound simultaneously with aluminium and an aqueous solution of an acid selected from the group consisting of sulfuric acid, phosphoric acid and hydrochloric acid, said solution containing not more than 50 per cent by weight of said acid, the quantity of acid present being sufficient to maintain an acid reaction medium, until after the reduction is finished.

2. A process for preparing an aminophenol comprising reducing a nitroaromatic compound containing no substituent in the para position to the nitro group by reacting the nitroaromatic compound simultaneously with aluminium and an aqueous solution of an acid selected from the group consisting of sulfuric acid, phosphoric acid and hydrochloric acid, said solution containing not more than 10 per cent by weight of said acid, the quantity of acid present being sufficient to maintain an acid reaction medium, until after the reduction is finished.

3. A process for preparing an aminophenol comprising reducing a nitroaromatic compound containing no substituent in the para position to the nitro group by reacting the nitroaromatic compound simultaneously with aluminium and an aqueous solution of an acid selected from the group consisting of sulfuric acid, phosphoric acid and hydrochloric acid, at a temperature of from about 50° C. to about 100° C., said solution containing not more than about 50 per cent by weight of said acid, the quantity of acid being sufficient to maintain an acid reaction medium until after the reduction is finished.

4. A process for preparing an aminophenol comprising reducing a nitroaromatic compound containing no substituent in the para position to the nitro group by reacting the nitroaromatic compound simultaneously with aluminium and an aqueous solution of an acid selected from the group consisting of sulfuric acid, phosphoric acid and hydrochloric acid, at a temperature of from about 80° C. to about 100° C., said solution containing not more than about 50 per cent by weight of said acid, the quantity of acid being sufficient to maintain an acid reaction medium until after the reduction is finished.

5. A process for preparing p-aminophenol comprising reducing nitrobenzene by reacting the nitrobenzene simultaneously with aluminium and an aqueous solution of sulfuric acid containing not more than 50 per cent by weight of the sulfuric acid, the quantity of acid present being sufficient to maintain an acid reaction medium until after the reduction is finished.

6. A process for preparing p-aminophenol comprising reducing nitrobenzene by reacting the nitrobenzene simultaneously with aluminium and an aqueous solution of sulfuric acid containing not more than 10 per cent by weight of the sulfuric acid, the quantity of acid present being sufficient to maintain an acid reaction medium until after the reduction is finished.

7. A process for preparing p-aminophenol comprising reducing nitrobenzene by reacting, at a temperature of from about 50° C. to about 100° C., the nitrobenzene simultaneously with aluminium and an aqueous solution of sulfuric acid containing not more than 10 per cent by weight of the sulfuric acid, the quantity of acid present being sufficient to maintain an acid reaction medium until after the reduction is finished.

8. A process for preparing p-aminophenol comprising reducing nitrobenzene by reacting, at a temperature of about 80° C. to about 100° C., the nitrobenzene simultaneously with aluminium and an aqueous solution of sulfuric acid containing not more than 10 per cent by weight of the sulfuric acid, the quantity of acid present being sufficient to maintain an acid reaction medium until after the reduction is finished.

9. A process for preparing 1,4-aminonaphthol comprising reducing α-nitronaphthalene by reacting the α-nitronaphthalene simultaneously with aluminium and an aqueous solution of sulfuric acid containing not more than 50 per cent by weight of sulfuric acid.

10. A process for preparing 1,4-aminonaphthol comprising reducing α-nitronaphthalene by reacting the α-nitronaphthalene simultaneously with aluminium and an aqueous solution of sulfuric acid containing not more than 10 per cent by weight of sulfuric acid, the quantity of acid present being sufficient to maintain an acid reaction medium until after the reduction is finished.

11. A process for preparing 1,4-aminonaphthol comprising reducing α-nitronaphthalene by reacting, at a temperature of about 50° C. to about 100° C., the α-nitronaphthalene simultaneously with aluminium and an aqueous solution of sulfuric acid containing not more than 10 per cent by weight of sulfuric acid, the quantity of acid present being sufficient to maintain an acid reaction medium until after the reduction is finished.

12. A process for preparing 1,4-aminonaphthol comprising reducing α-nitronaphthalene by reacting, at a temperature of about 80° C. to about 100° C., the α-nitronaphthalene simultaneously with aluminium and an aqueous solution of sulfuric acid containing not more than 10 per cent by weight of the sulfuric acid, the quantity of acid present being sufficient to maintain an acid reaction medium until after the reduction is finished.

13. A process for preparing 4-amino-3-methyl-1-naphthol comprising reducing 2-methyl-1-nitronaphthalene by reacting the 2-methyl-1-nitronaphthalene simultaneously with aluminium and an aqueous solution of sulfuric acid containing not more than 50 per cent by weight of the sulfuric acid, the quantity of acid present being sufficient to maintain an acid reaction medium until after the reduction is finished.

14. A process for preparing 4-amino-3-methyl-1-naphthol comprising reducing 2-methyl-1-nitronaphthalene by reacting the 2-methyl-1-nitronaphthalene simultaneously with aluminium and an aqueous solution of sulfuric acid containing not more than 10 per cent by weight of the sulfuric acid, the quantity of acid present being sufficient to maintain an acid reaction medium until after the reduction is finished.

15. A process for preparing 4-amino-3-methyl-1-naphthol comprising reducing 2-methyl-1-nitronaphthalene by reacting the 2-methyl-1-nitronaphthalene, at a temperature of about 50° C. to about 100° C., simultaneously with aluminium and an aqueous solution of sulfuric acid containing not more than 10 per cent by weight of the sulfuric acid, the quantity of acid present being sufficient to maintain an acid reaction medium until after the reduction is finished.

16. A process for preparing 4-amino-3-methyl-1-naphthol comprising reducing 3-methyl-1-nitronaphthalene by reacting the 2-methyl-1-nitronaphthalene, at a temperature of about 80° C. to about 100° C., simultaneously with aluminium and an aqueous solution of sulfuric acid containing not more than 10 per cent by weight of the sulfuric acid, the quantity of acid present being sufficient to maintain an acid reaction medium until after the reduction is finished.

FREDERIC R. BEAN.

REFERENCES CITED

The following references are of record in the file of this patent:

UNITED STATES PATENTS

| Number | Name | Date |
|---|---|---|
| 2,132,454 | Bassford | Oct. 11, 1938 |
| 2,198,249 | Henke | Apr. 23, 1940 |
| 2,273,101 | Haberland | Feb. 17, 1942 |

FOREIGN PATENTS

| Number | Country | Date |
|---|---|---|
| 96,853 | Germany | Mar. 15, 1898 |